United States Patent [19]

Nguyen et al.

[11] Patent Number: 5,114,460

[45] Date of Patent: * May 19, 1992

[54] PRODUCTION OF LOW-CHLORIDE ALKALI METAL PHOSPHATES

[75] Inventors: Kim D. Nguyen; Donald R. Spink, both of Waterloo, Canada

[73] Assignee: Alpine Plant Foods limited, New Hamburg, Canada

[ * ] Notice: The portion of the term of this patent subsequent to Oct. 8, 2008 has been disclaimed.

[21] Appl. No.: 746,349

[22] Filed: Aug. 16, 1991

Related U.S. Application Data

[63] Continuation-in-part of Ser. No. 429,766, Oct. 31, 1989, Pat. No. 5,055,124.

[51] Int. Cl.⁵ .......................... C01B 25/30; C05B 7/00
[52] U.S. Cl. .......................................... 71/34; 71/35; 423/305; 423/309; 423/313; 423/315
[58] Field of Search ............... 423/305, 309, 313, 315; 71/34, 35

[56] References Cited

U.S. PATENT DOCUMENTS

| | | | |
|---|---|---|---|
| 1,805,873 | 5/1931 | Kaselitz | 423/309 |
| 1,865,968 | 7/1932 | Schuppe | 423/309 |
| 2,064,979 | 12/1936 | Kaselitz | 423/309 |
| 3,554,729 | 1/1971 | Curless | 423/309 |
| 4,158,558 | 6/1979 | Thompson et al. | 71/64.1 |
| 4,678,649 | 7/1987 | Alexander et al. | 71/34 |
| 4,836,995 | 6/1989 | Manor et al. | 423/313 |
| 4,885,148 | 12/1989 | Erickson et al. | 423/309 |

Primary Examiner—Wayne Langel
Attorney, Agent, or Firm—Sim & McBurney

[57] ABSTRACT

Potassium phosphate useful as a low-chloride content fertilizer is prepared by reacting phosphoric acid, commercial or technical grade, with fertilizer-grade potassium chloride (Muriate of Potash, 60-63% $K_2O$) at a reaction temperature of about 130° C. and a mole ratio of phosphorus to potassium of at least about 1.3:1. The vaporization of hydrogen chloride from the reaction mixture is effected by a novel technique combining air followed by steam stripping. The reaction product is used to produce various types as well as grades of fertilizers. The procedure may be used to form sodium phosphate in analogous manner from sodium chloride, which then may be converted to trisodium phosphate or sodium tripolyphosphate. The potassium phosphate may be converted to potassium pyrophosphate by neutralization with potassium hydroxide followed by calcination.

24 Claims, 2 Drawing Sheets

PRODUCTION OF LOW-CHLORIDE ALKALI METAL PHOSPHATES

REFERENCE TO RELATED APPLICATION

This application is a continuation-in-part of Ser. No. 429,766 filed Oct. 31, 1989, U.S. Pat. No. 5,055,124.

FIELD OF INVENTION

The present invention is directed to the production of alkali metal phosphates, in particular, potassium phosphates with low residual chloride content and useful as a fertilizer.

BACKGROUND TO THE INVENTION

Chemical fertilizers originally were produced as substitutes for manure. The nature of fertilizer products and their production methods, however, have changed drastically with the development of modern agricultural practices. The goal for modern farmers is to obtain maximum yields of plant produce per unit area of ground. Included in the trend toward maximum yields are the planting of the same crops year after year on the same ground, growing a larger number of individual plants per unit area and the use of new plant varieties bred specifically for crowded planting for maximum yield. For this intensive type of agriculture, chemical fertilizer has to be applied at very high rates and in such a scheme so as to supply all plant nutrients in a form which is readily available to the plants. Moreover, when chemical fertilizer is applied at high rates, it is important to prevent accumulation in the soil of undesirable ingredients, such as chloride ion and sulphate ion. A low-chloride chemical fertilizer also is necessary for application to chloride-sensitive crops, such as tobacco, potatoes and grapes, as well as for plant germination or foliage spraying.

Potassium phosphates have been long recognized as a potentially attractive fertilizer product because of their high nutrient content, their chloride-free advantage over conventional NPK fertilizers, their slow release characteristics and excellent agronomic properties in general. Shipping and storage costs for high nutrient ($P_2O_5$, $K_2O$) potassium phosphates (80–85% nutrient value for monopotassium phosphate and 90–100% nutrient value for potassium polyphosphates) would be significantly lower than for their lower nutrient value competitive products. In addition, being a chloride-free fertilizer, potassium phosphates may replace fertilizer in areas where chloride build-up in the soil or plant sensitivity to chlorides is a concern. Agronomic studies have confirmed that potassium phosphates are high quality, slow release fertilizers.

While technologies for the production of potassium phosphate do exist, (including neutralization of $H_3PO_4$, acidulation of KCl with excess $H_3PO_4$, high temperature and pressure fusion of KCl and $H_3PO_4$ and ion-exchange and/or solvent extraction of KCl and $H_3PO_4$), the commercial manufacture of this valuable fertilizer in large quantities has not yet been realized, chiefly because of economic reasons. Limited quantities have been produced by direct neutralization of phosphoric acid with caustic potash for specific applications where a high sale price justified the high cost of production, such as in the greenhouse and hydroponics industry, seed germination and plant foliage spray. The high cost of caustic potash coupled with its corrosive nature and difficulty in storage have prompted many researchers and chemists to look for a process to replace potassium hydroxide with a much cheaper source of potassium, such as potassium chloride.

Monopotassium phosphate can be produced by the reaction of phosphoric acid with potassium chloride, according to the well known reaction:

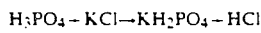

$$H_3PO_4 + KCl \rightarrow KH_2PO_4 + HCl$$

In practice, the removal of hydrogen chloride from the reaction mixture is difficult to achieve, unless a high temperature and/or a large excess of phosphoric acid are employed. In the first case, the water-insoluble potassium metaphosphate $(KPO_3)_n$ is preferentially formed and, in the second case, separation of pure potassium salt from the excess acid is an impractical as well as expensive unit operation.

A number of workers have described specific methods for the removal of chloride from the reaction product of potassium chloride with phosphoric acid. Ross and Hazen in U.S. Pat. No. 1,456,831 teach the reaction of potassium chloride with phosphoric acid at temperatures of 250° C. and above and describe the use of air to increase the rate of HCl evolution. Askenasy et al, Zeit. Anorg. u. Allgem. Chemie, 189,305–28 (1930), discuss the use of steam in place of air for increasing the rate of reaction of potassium chloride with phosphoric acid and indicate that, even at 200° C., a residual chloride content of 4% Cl is obtained in the product. Thompson, U.S. Pat. No. 4,158,558 is a process for producing potassium polyphosphate uses temperatures from 200° to 300° C. to remove residual chloride from a product produced from a mole ratio of potassium-to-phosphorus of 1:1 to 1.25:1.

Britzke et al., J. Chem. Ind. (Moscow), 7, 4–11 (1930), describe experiments similar to those of Askenasy et al, as well as the use of reduced pressure in accelerating the reaction of potassium chloride with phosphoric acid. The use of reduced pressure also is mentioned by Kaselitz, U.S. Pat. No. 1,805,873. More recently Provoost, French Patent 1,395,837 has described the preparation of a specific fertilizer having a $P_2O_5$ to $K_2O$ weight ratio of 1:1 by addition of one mole of sulfuric acid for each two moles of phosphoric acid used in the reaction. Provoost also describes the use of air to increase the rate of reaction.

In Curless, U.S. Pat. No. 3,554,729, there is described a procedure for the production of a potassium phosphate containing less than 2 wt. % Cl, as required in the present invention. However, this result is achieved in this reference by a combination of the utilization of reduced pressure for the process, steam stripping of the material and utilization of the presence of at least 0.02 mole of sulfuric acid per mole of potassium chloride. The addition of the sulfuric acid results in the presence of potassium sulfate in the product. Potassium sulfate is substantially less soluble in water than potassium phosphate, so that additional processing of the liquid fertilizer would be necessary prior to its use.

The prior art, therefore, has disclosed that the reaction of potassium chloride with phosphoric acid should be carried out at temperatures higher than about 200° C. and/or in the presence of excess phosphoric acid and/or the use of additives. Even under such stringent operating conditions, the chloride content in the resulting reaction product could not be reduced further than 4 wt. % chloride. However, to be universally acceptable as a low-chloride fertilizer, the finished product should contain 2 wt. % or less of chloride, as required for certain crops or applications. Moreover, to be economical, the process should be carried out at a temperature below 200° C. for three reasons. First, at temperatures near or above 200° C., the cost of suitable materials for construction increases to such an extent that the process cannot be operated economically. Secondly, impurities normally associated with fertilizer-grade phosphoric acid, particularly iron and magnesium, react with the phosphorus and potassium components of the system above 200° C. to form complex materials which may be unavailable for utilization by plants. Thirdly, above about 200° C., organic materials associated with the commonly-used phosphoric acid is evolved, contaminating the by-product HCl and rendered it unsuitable for sale.

Other forms of potassium phosphate which are commercially useful include tetrapotassium pyrophosphate (TKPP), $K_4P_2O_7 \cdot 3H_2O$, which is used in liquid detergents and cleaners as well as in water treatment, for example, scale prevention in high pressure boilers, cleaners for electroplating operations, where TKPP acts as a sequestrant, in drilling muds for oil wells, where it function as a thinner for clays. Based on $P_2O_5$ content, TKPP accounts for approximately 79% of total phosphate production.

Currently, TKPP is produced by neutralization of furnace-grade phosphoric acid with caustic potash (KOH), according to the two-step reaction depicted by the following equations:

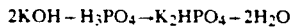
$2KOH + H_3PO_4 \rightarrow K_2HPO_4 + 2H_2O$

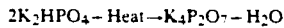
$2K_2HPO_4 + Heat \rightarrow K_4P_2O_7 + H_2O$

Overall: $2H_3PO_4 + 4KOH \rightarrow K_4P_2O_7 + 5H_2O$.

As may be seen from these equations, in the first stage of the reaction, caustic potash (KOH) reacts with the furnace-grade phosphoric acid to dipotassium hydrogen phosphate ($K_2HPO_4$). This reaction is controlled by monitoring the pH of the solution. In the second stage of the reaction, $K_2HPO_4$ is fed into a rotary kiln, where it is heated to approximately 400° C. Water evolves and TKPP is formed in solid form. The procedure is simple but energy intensive, since, as may be seen from the overall equation, five moles of water are required to be evaporated to produce one mole of TKPP.

SUMMARY OF INVENTION

We have now surprisingly found that it is possible to form potassium phosphate from potassium chloride and phosphoric acid with a residual chloride content below about 2 wt. %, preferably below about 1 wt. %, utilizing a reaction temperature below about 200° C. This result is achieved by employing a specific molar ratio of phosphorus to potassium in the reaction and a specific two-step procedure to remove by-product HCl.

The present invention is particularly concerned with the manufacture of potassium phosphate useful as a fertilizer from fertilizer grade potassium chloride and technical grade phosphoric acid. However, the invention is broadly directed to the production of potassium phosphate for a variety of purposes, including conversion into other useful chemical products. In the product produced by the process of the invention, the available amount of $P_2O_5$ is highly water-soluble and hence the product is useful for the production of various types of fertilizer, such as liquid, suspension or solid forms.

Since the $K_2O\text{-}P_2O_5\text{-}H_2O$ (potassium phosphate) system parallels the sodium system in many respects, the reaction of phosphoric acid and sodium chloride produces the equivalent monosodium phosphate ($NaH_2PO_4$). Accordingly, the present invention includes such reaction. As in the potassium phosphate system, higher molar Na:P ratios produce different phosphate salts, namely disodium monohydrogen phosphate ($Na_2HPO_4$-Na:P=2) and trisodium phosphate ($Na_3PO_4$ - Na:P=3).

Accordingly, in one aspect of the present invention, there is provided a process for the production of a mono alkali metal phosphate selected from potassium phosphate and sodium phosphate, which comprises (a) reacting potassium chloride or sodium chloride with phosphoric acid in a molar feed ratio of phosphorus to potassium in the range of at least about 1.3:1 at a temperature of about 130° to about 200° C. to form potassium phosphate or sodium phosphate and by-product hydrogen chloride; (b) removing the hydrogen chloride from the reaction mixture by passing air through the reaction mixture during a first portion of the period for the reaction of the potassium chloride or sodium chloride and by passing steam through the reaction mixture during the remainder of the period of the reaction of the potassium chloride or sodium chloride to result in a potassium phosphate or sodium phosphate product respectively having residual chloride content less than about 2 wt. %; and (c) recovering the stripped hydrogen chloride in the form of hydrochloric acid having a concentration of at least about 20 wt. % HCl.

The invention is particularly described hereinafter with specific reference to the formulation of potassium phosphate from potassium chloride. However, as noted above, the invention includes the production of sodium phosphate from sodium chloride or sodium carbonate by equivalent procedures.

In another aspect, the present invention provides a method for producing potassium pyrophosphate, which comprises steps (a), (b) and (c) from the first aspect of the invention to form potassium phosphate; (d) reacting the potassium phosphate with potassium hydroxide under pH conditions sufficient to neutralize the potassium phosphate; and (e) calcining the neutralized potassium phosphate at a temperature of about 200° C. to about 400° C. to form potassium pyrophosphate.

GENERAL DESCRIPTION OF INVENTION

Figure 1:
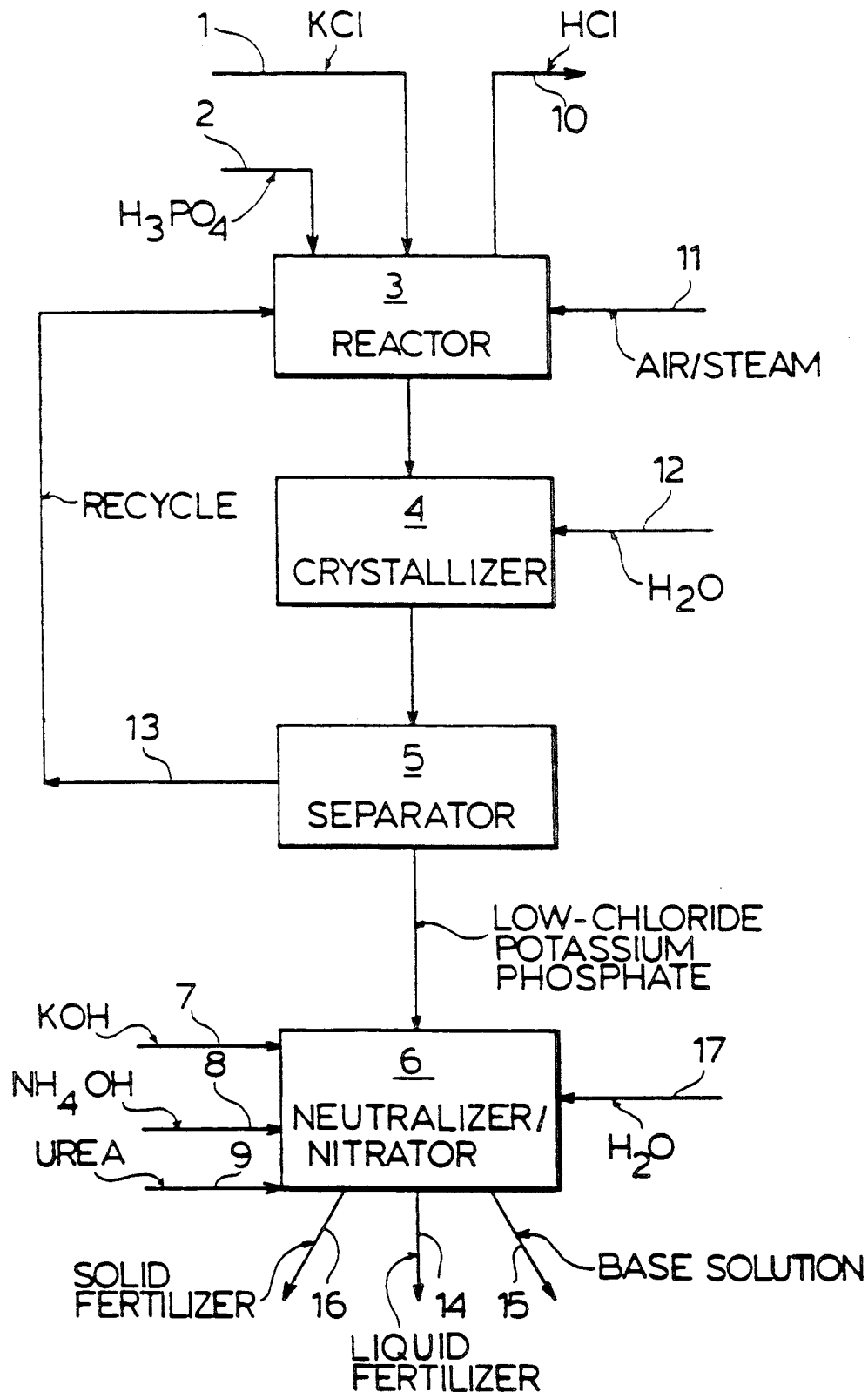
FIG. 1 is a flow sheet of a continuous process for the production of low-chloride potassium phosphate from fertilizer grade potassium chloride and technical grade phosphoric acid, according to one embodiment of this invention.

According to the present invention, a process is provided for the manufacture of potassium phosphates and liquid fertilizer by reacting potassium chloride with phosphoric acid at a temperature below 200° C. at a specific mole ratio of phosphorus to potassium. The solid potassium phosphate product contains less than about 2 wt. % chloride and the liquid fertilizer product contains preferably less than about 0.5 wt. % chloride.

A novel air-steam combination technique is employed to efficiently remove almost all the by-product hydrogen chloride from the reaction mixture. We have found by experimentation that, while air or steam alone may be used to facilitate the removal of hydrochloric acid, such use at this low temperature for the prolonged period necessary to remove almost all the chloride is detrimental to the outcome of the process. First, at a reaction temperature below 200° C., the reaction between potassium chloride and phosphoric acid proceeds rather slowly, such that the blowing of air through the reaction mixture for a prolonged period of time leads to dehydration, condensation and probably transformation of phosphoric acid from the reactive form (ortho) to an unreactive form (meta). Consequently, a product that contains a chloride level higher than about 2% Cl is produced. On the other hand, the use of steam as the sole stripping means results in a very dilute by-product hydrochloric acid which requires costly treatment to either concentrate the acid for sale or for disposal.

We have found, in accordance with this invention, that air stripping followed by a short steam strip, preferably in combination with continued air stripping, succeeded in removing almost all chloride at a low temperature of under 200° C. and within a specific ratio of P:K, as well as producing a high strength by-product hydrochloric acid suitable for commercial use. The role of the steam as practiced in our invention is to effect the extent of reaction as well as rate, causing resumption of liberation of hydrogen chloride after equilibrium conditions have been obtained and the reaction has ceased at the end of the air strip step. In other words, the reaction is enhanced when steam is utilized following the air strip step due to its hydrolysis effect on the dehydrated phosphate and phosphoric acid.

It is usually preferred to effect a high proportion of the reaction during the air stripping step to minimize the diluting effect of the steam on the hydrochloric acid strength attainable. Generally, air stripping is utilized to an extent which permits the recovery of a hydrochloric acid having a strength of at least about 20 wt. % HCl, up to about 33 wt. % HCl. In order to produce the required hydrochloric acid strength and produce a product having a residual chloride content below about 2 wt. %, it is generally necessary to effect at least 90% of the reaction of the potassium chloride, and preferably about 90 to 95% of the reaction of the potassium chloride, while air stripping is effected, with the balance of the reaction being effected while steam stripping is effected. Preferably, air stripping is continued during the steam stripping step.

The process of the present invention is carried out by reacting potassium chloride with phosphoric acid. The potassium chloride is employed in solid particulate form and preferably is fertilizer grade (i.e. Muriate of Potash, 60 to 63% $K_2O$), where the potassium phosphate product is to be used as a fertilizer. The phosphoric acid may be any commercial phosphoric acid containing from about 30 to about 75 wt. % $P_2O_5$. Preferably, particularly when the product is to be used as a low-chloride-content fertilizer, the phosphoric acid is technical grade phosphoric acid containing a least about 50 wt. % up to about 75 wt. % $P_2O_5$.

The process is carried out at a temperature below about 200° C., generally from about 130° to about 200° C., preferably about 150° to about 190° C. Below about 130° C., the reaction becomes impractically slow while above 200° C., undesirable products form.

The potassium chloride and phosphoric acid are reacted in a mole ratio of phosphorus to potassium of at least about 1.3:1, preferably about 1.5:1 to about 2.0:1. A molar ratio of phosphoric acid to potassium chloride up to about 4:1 generally can be employed. Higher molar ratios are possible but the process is generally uneconomic, in view of the large amount of unreacted phosphoric acid which is present in the product, if carried out in a batch process, and the large volume of recycle required, if carried out in a continuous process. At a mole ratio below 1.3:1, it is not possible to achieve a residual chloride concentration below 2 wt. % even when employing the combined air/steam process steps of the invention.

The process is sufficiently flexible to permit the preparation of a wide variety of fertilizer compositions by appropriate treatment of the potassium phosphate product. In one particular embodiment of the process according to the invention, the reaction product is recovered as pure potassium dihydrogen phosphate with a high analysis of plant nutrient. In another embodiment, the reaction product is dissolved in water to yield a low-chloride (less than 1 wt. %) liquid fertilizer of analysis such as 0-20-10 (N-K-P). The resulting reaction product also may be ground up to yield a solid fertilizer material of high analysis, such as 0-52-28.

Alternatively, the product may be ammoniated to make a near neutral pH (pH 6 to 8), low-chloride (less than 1 wt. %) liquid fertilizer with a desired nutrient analysis, such as 3-18-9. Further, the product may be neutralized with caustic potash solution, followed by nitration with ammonia and urea, to produce a low-chloride liquid fertilizer having a desired analysis, such as 5-15-10, 10-15-10, 10-10-10, 12-12-12; suspension fertilizer, such as 15-15-15, or high analysis low-chloride solid fertilizer, such as 18-18-18.

The process of this invention may be operated on a continuous basis as well as a batch operation, as described below with reference to the Figures of drawings.

The potassium phosphate product also may be employed to form potassium pyrophosphate. This procedure involves a two-step operation, in which the potassium phosphate first is neutralized with potassium hydroxide and then the neutralized potassium phosphate is dehydrated to form the potassium pyrophosphate, in accordance with the equations:

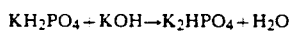

$$KH_2PO_4 + KOH \rightarrow K_2HPO_4 + H_2O$$

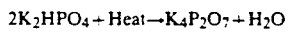

$$2K_2HPO_4 + Heat \rightarrow K_4P_2O_7 + H_2O$$

for a batch process employing a molar ratio of $H_3PO_4/KCl$ of about 1.5, the overall reaction to produce one mole of $K_4P_2O_7$ can be represented by the equation:

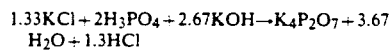

$$1.33KCl + 2H_3PO_4 + 2.67KOH \rightarrow K_4P_2O_7 + 3.67 H_2O + 1.3HCl$$

The neutralization step is effected under pH conditions sufficient to obtain the desired neutralization to dipotassium hydrogen phosphate, generally from about 8 to about 10, preferably about pH9.

The dehydration step is effected by calcining the neutralized potassium phosphate at a suitable temperature, generally about 200° to about 400° C. The potassium pyrophosphate is recovered as a white powder which is highly water-soluble (187 g/100 g of water at 25° C.) but is insoluble in ethanol.

It is preferred to effect the production of potassium pyrophosphate employing the continuous production of potassium phosphate, since this enables less phosphoric acid to be used and consequently less potassium hydroxide to be employed to produce one mole of TKPP, as seen from the following overall equation:

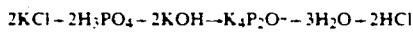

As mentioned above, the process of the invention may be used to form sodium phosphate from sodium chloride and phosphoric acid. The sodium chloride may be replaced in this reaction by sodium carbonate.

The sodium phosphate may be recovered in the form of pure monobasic or dibasic sodium orthophosphates, depending on the reaction condition.

The sodium phosphate product may be neutralized with caustic soda to produce trisodium phosphate, which is used in many heavy-duty cleaning processes as well as disinfectant cleaners, scouring powders and automatic dishwasher formulations.

A mixture of the monobasic and dibasic sodium orthophosphate, in the molar ratio of about one mole of monobasic to about two moles of dibasic, may be calcined to form sodium tripolyphosphate, which is widely used as a builder for heavy-duty washing powders.

DESCRIPTION OF PREFERRED EMBODIMENTS

In FIG. 1, which is a flow sheet of a continuous process, solid particulate potassium chloride from a conduit 1 and phosphoric acid from conduit 2 are fed continuously to an acidulation reactor 3 maintained at the desired reaction temperature in desired manner. In the reactor 3, the feeds along with recycle by-product provide the desired mole ratio of phosphorus to potassium. Air and steam are injected sequentially to the reactor 3 by line 11. Hydrochloric acid, together with some water vapor, is removed from the reactor 3 by line 10. The product formed in reactor 3 is sent to a cooler/crystallizer 4 in continuous manner. Cold water is introduced into the crystallizer from conduit 12. Pure solid crystalline potassium phosphate is separated from unreacted excess phosphoric acid and soluble phosphate salt in separator 5. The recycle stream 13 containing the unreacted phosphoric acid and soluble phosphate salts is recycled to reactor 3 in continuous manner.

The resulting low-chloride potassium phosphate crystals may be processed further. For this purpose, the crystals may be fed to a neutralizer/nitrator unit 6 into which also are introduced caustic potash by line 7, ammonia and/or urea by lines 8/9 and water by line 17. Depending on the operating conditions in the neutralizer/nitrator 6, a solid product may be removed by line 16, or a base solution may be removed by line 14 or a liquid product may be removed by line 15.

Figure 2:
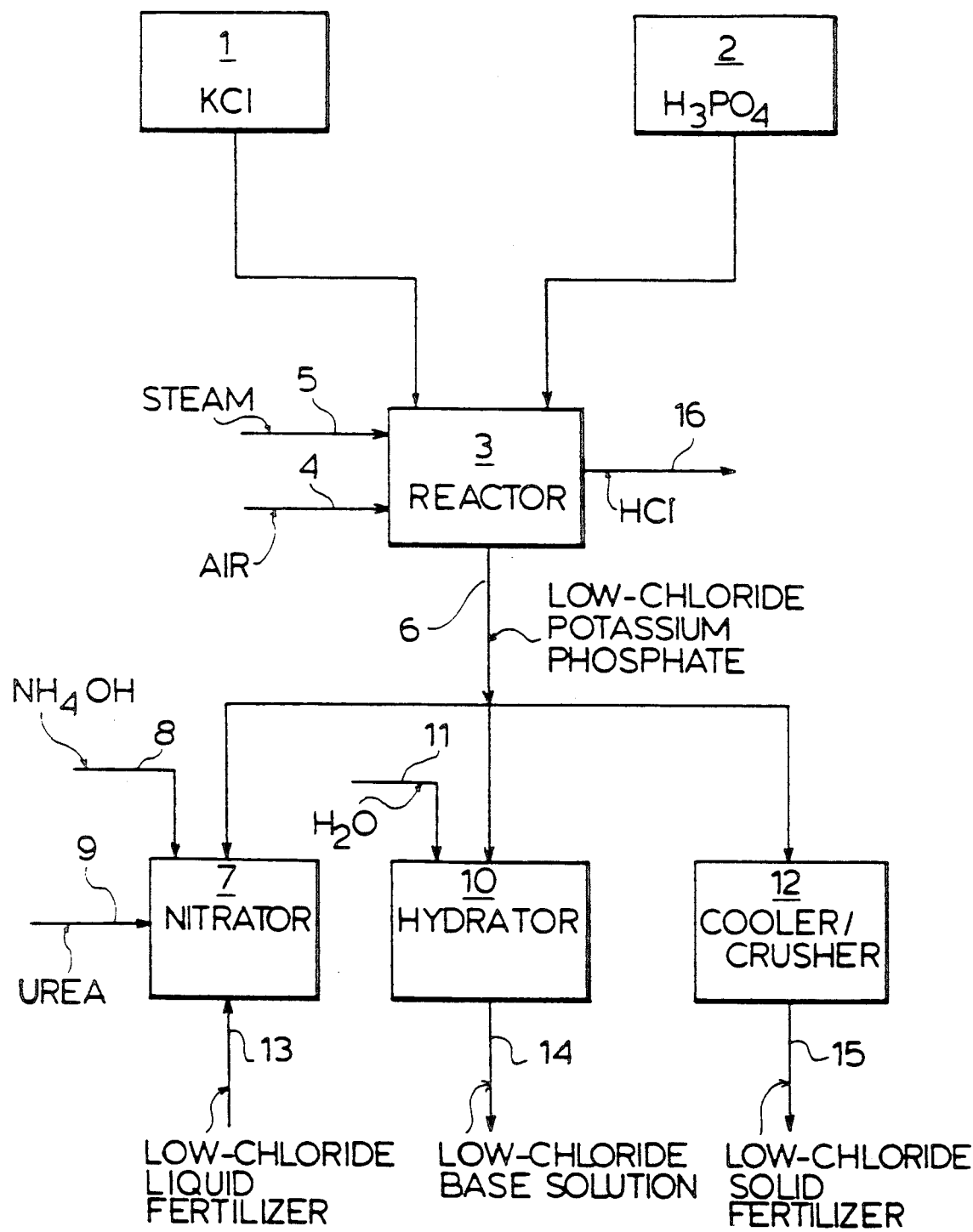
FIG. 2 is a corresponding flow sheet for a batch process for the production of low-chloride potassium phosphate, according to another embodiment of this invention.

Referring now to FIG. 2, which is a flow sheet of a batch process, solid particulate potassium chloride from storage 1 and phosphoric acid from storage 2 are fed to the acidulation reactor 3 to provide the desired phosphorus to potassium mole ratio therein. The reactor 3 is maintained at the desired reaction temperature in any convenient manner. Air from conduit 4 and later steam from conduit 5 are injected into reactor 3. Hydrochloric acid and some water vapor are removed from the reactor 3 by line 16. The product, low-chloride potassium phosphate from reactor 3 may be fed to the nitrator 7 into which also are introduced ammonia from conduit 8 and/or urea from conduit 9 to produce low-chloride liquid fertilizer having a neutral pH of 6 to 8 and thence to storage by line 13. Alternatively, the potassium phosphate-containing product from reactor 3 may be fed to a hydrator 10 into which cold water is injected by line 11 to yield a low-chloride, acidic base solution to be stored by line 14.

The low-chloride potassium phosphate-containing product from reactor 3 also may be fed to a cooler/crusher 12 from which a low-chloride, high analysis solid fertilizer is passed to storage by line 15.

EXAMPLES

Example I

Several experiments were run in which solid, particulate fertilizer-grade potassium chloride (Muriate of Potash, 62% $K_2O$) was fed into a glass stirred reactor containing hot technical grade phosphoric acid. The range of feed molar ratio of $H_3PO_4$ to KCl in the reactor was 1:1, 1.3:1, 1.5:1, 1.8:1 and 2:1. The temperature ranged from 154° C. to 180° C. Various stripping means were employed, including hot air and a two-step air/steam stripping operation. When the air/steam stripping operation was effected, steam was introduced 90 minutes after the start of the reaction and air stripping continued to be applied.

The resulting products were analyzed for chloride contents as well as $P_2O_5$ and $K_2O$. The hydrochloric acid evolved was collected in a condenser and analyzed for the acid content. All the experiments, except experiments 4 and 5 (see Table I below) were conducted batchwise, while experiments 4 and 5 were conducted in a continuous manner as illustrated in FIG. 1.

The results of these experiments are summarized in the following Table I:

TABLE I

| Exp. No. | $H_2PO_4$/KCl (P:K MR) | Temp (°C.) | Time (min.) | Stripping Medium | Efficiency of Cl Removal % | Product Analysis | | By-Product | |
|---|---|---|---|---|---|---|---|---|---|
| | | | | | | $P_2O_5$ (Wt. %) | $K_2O$ (Wt. %) | Cl | HCl Conc (Wt. %) |
| 1 | 2.0 | 180 | 120 | Air | 79.3 | 61.7 | 25.6 | 3.10 | 21.0 |
| 2 | 2.0 | 180 | 120 | Steam | 96.2 | 66.7 | 25.9 | 0.16 | 5.0 |
| 3 | 2.0 | 180 | 120 | Air/Steam | 99.8 | 65.3 | 20.8 | .02 | 25.0 |
| 4 | 1.8 | 180 | 90 | Steam | 92.0 | 55.0 | 31.4 | .03 | 5.0 |
| 5 | 1.8 | 154 | 90 | Steam | 89.0 | 52.0 | 33.4 | .30 | 5.0 |
| 6 | 1.5 | 180 | 120 | Air | 89.0 | 57.7 | 24.2 | 1.70 | 24.0 |
| 7 | 1.5 | 180 | 120 | Air/Steam | 96.0 | 56.4 | 25.3 | .78 | 25.4 |
| 8 | 1.3 | 180 | 120 | Air | 74.2 | 53.1 | 28.1 | 5.50 | 23.0 |
| 9 | 1.3 | 180 | 180 | Steam | 87.0 | 56.2 | 27.9 | 2.22 | 5.0 |
| 10 | 1.3 | 180 | 120 | Air/Steam | 93.0 | 50.4 | 26.7 | 1.13 | 26.0 |
| 11 | 1.0 | 180 | 120 | Air | 48.1 | 46.1 | 31.6 | 12.40 | 24.0 |
| 12 | 1.0 | 180 | 120 | Steam | 59.3 | 40.2 | 21.2 | 8.80 | 5.0 |

TABLE I-continued

| Exp. No. | H$_3$PO$_4$/KCl (P:K MR) | Temp (°C) | Time (min) | Stripping Medium | Efficiency of Cl Removal % | Product Analysis P$_2$O$_5$ (Wt %) | K$_2$O | By-Product Cl (Wt %) | HCl Conc |
|---|---|---|---|---|---|---|---|---|---|
| 13 | 1.0 | 180 | 120 | Air/Steam | 85.0 | 54.3 | 39.2 | 4.12 | 25.0 |

It is apparent from the results set forth in Table I that the chloride removal efficiency is closely associated with the feed molar ratio of H$_3$PO$_4$ to KCl. For a feed molar ratio higher than 1.5, the chloride removal was satisfactory (i.e. less than about 2 wt. % Cl$^-$ in product) at the reaction temperature of 154° C. as well as at 180° C. Under these circumstances, steam sparging or air sparging followed by a steam injection may be used as the stripping vehicle to facilitate the removal of hydrogen chloride. However, when steam stripping alone is used, the product hydrochloric acid is very dilute and hence is unsatisfactory. However, at a molar feed ratio of H$_3$PO$_4$ to KCl equal to 1.5, only air stripping followed by steam sparging succeeded in reducing the chloride level in the product to a desired content (less than 2 wt. %) and, at the same time, produced a high concentration hydrochloric acid (at least 20 wt. % HCl). At a molar feed ratio below 1.3, even with air stripping followed by steam sparging, it was not possible to obtain satisfactory levels for residual chloride.

Example II

A study on the optimum conditions in the acidulation reaction in batch processing was carried out. Three experiments were conducted in which solid, particulate fertilizer-grade potassium chloride (Muriate of Potash, 62% K$_2$O) was reacted with technical grade phosphoric acid in a 2.5L constant stirring glass reactor. The molar ratio of H$_3$PO$_4$ to KCl in the reactor in all three experiments was 1.5. The reaction was carried out at 180° C. using the air/steam stripping technique as described in Example I. The steam stripping was conducted for 60 minutes in all three experiments, but the air stripping duration was 60, 180, 140 minutes respectively. Air was sparged into the reactor at 50 SCFH for all three experiments.

Analysis of the chloride content in the product for all three experiments was 0.78, 0.72, 0.40 wt. % Cl$^-$ respectively.

Example III

Similar experiments to those conducted in Example II were carried out. While all the operating conditions as well as feed molar ratio of H$_3$PO$_4$ and KCl were similar to Example II, the air flow rate range varied from 50 to 30 and 10 SCFH. The duration of air sparging was 60 minutes for all three tests. Corresponding chloride analysis showed a level of 0.40, 0.51, 1.70 wt. % Cl$^-$ for the three products obtained from the acidulation reactor.

Example IV

The viscous mixture of potassium phosphate and excess phosphoric acid as obtained from Experiment 5, Table I, was treated by two techniques to produce a liquid fertilizer. In a first technique, the hot melt product at 180° C. was poured into a glass beaker containing cold water at 22° C. The soluble liquid fertilizer reached a maximum temperature of 51° C. with a solubility at room temperature of 56 g/100 g cold water. Analysis of the resulting acidic base fertilizer solution showed a N-P$_2$O$_5$-K$_2$O value of 0-19.8-9.8 with a low chloride content of 0.12% Cl. The liquid fertilizer was able to be stored at temperatures of 22° C. or 5° C. without crystallization.

In a second technique, the resulting hot melt product at 180° C. was poured into a dilute ammonia solution (1 to 5 wt. %). The maximum temperature of the liquid fertilizer was recorded at 70° C. The solution, having a neutral pH of 7.0, analyzed 3.1-18.4-9.1 with a low chloride of 0.10 wt. % Cl$^-$ and had good storage quality.

Example V

The procedure of Example 1 was repeated for various mole ratio of H$_3$PO$_4$ to KCl, namely 1.5, 2.0 and 2.65 at a temperature of about 180°±5° C. The reaction was carried out for two hours during which preheated air was used as a sparging means. The by-product HCl evolved during this time was absorbed in an HCl absorber. The product KH$_2$PO$_4$, containing some excess H$_3$PO$_4$ was cooled to room temperature.

A known quality of this product was neutralized to a pH of 8.8 to 9.0 using a 45 wt. % KOH solution. Calcination of the neutralized solution was conducted at 200° C. and 400° C. for various calcination time in a Mellen tube furnace.

The products of the calcination were analyzed and the results are set forth in the following Table II:

TABLE II

Production of Potassium Pyrophosphate from batch process products

| | Starting Batch Products | | | | TKPP produced | | | | | | |
|---|---|---|---|---|---|---|---|---|---|---|---|
| Exp. No. | H$_3$PO$_4$/KCl (P:K MR) | % P | % K | % Cl | Temp. (°C) | Time (min) | % P | % K | % Cl | Solubility (g/g H$_2$O) | Color |
| 1 | 1.5 | 25.40 | 19.25 | 0.53 | 200 | 15 | 19.42 | 46.93 | 0.89 | 1.874 | White |
| 2 | 1.5 | 25.40 | 19.25 | 0.53 | 200 | 60 | 19.53 | 47.03 | 0.71 | 1.874 | White |
| 3 | 1.5 | 25.40 | 19.25 | 0.53 | 400 | 15 | 19.83 | 47.73 | 0.52 | 1.874 | White |
| 4 | 1.5 | 25.40 | 19.25 | 0.53 | 400 | 30 | 19.75 | 47.93 | 0.55 | 1.874 | White |
| 5 | 1.5 | 25.40 | 19.25 | 0.53 | 400 | 60 | 19.81 | 48.12 | 0.53 | 1.874 | White |
| 6 | 2 | 26.33 | 16.91 | <50 ppm | 200 | 60 | 16.04 | 40.69 | <50 ppm | 1.874 | White |
| 7 | 2 | 26.33 | 16.91 | <50 ppm | 400 | 60 | 18.25 | 47.13 | <50 ppm | 1.874 | White |
| 8 | 2.65 | 27.48 | 13.16 | <50 ppm | 200 | 60 | 16.72 | 41.07 | <50 ppm | 1.874 | White |
| 9 | 2.65 | 27.48 | 13.16 | <50 ppm | 400 | 60 | 18.94 | 47.75 | <50 ppm | 1.874 | White |

SUMMARY OF DISCLOSURE

In summary of this disclosure, the present invention provides a novel procedure for forming low-chloride potassium phosphate useful as a fertilizer or convertible into a variety of fertilizer materials or other useful products by employing specific process conditions and utilizing a unique two-step stripping procedure using air and steam to remove hydrogen chloride and recover a high strength hydrochloric acid by-product. The procedure also may be used to form sodium phosphate. The potassium phosphate may be converted to potassium pyrophosphate. Modifications are possible within the scope of this invention.

What we claim is:

1. A process for the production of a mono alkali metal phosphate selected from potassium phosphate and sodium phosphate, which comprises:

reacting an alkali metal chloride selected from potassium chloride and sodium chloride with phosphoric acid in a molar feed ratio of phosphorus to potassium or sodium in the range of at least about 1.3:1 at a temperature of about 130° C. to about 200° C. to produce potassium phosphate from said potassium chloride or sodium phosphate from said sodium chloride and by-product hydrogen chloride.

removing said hydrogen chloride from the reaction mixture by passing air through the reaction mixture during a first portion of the period of reaction of the alkali metal chloride and by passing steam through the reaction mixture during the remainder of the period of reaction of the alkali metal chloride to result in a potassium phosphate product from said potassium chloride or a sodium phosphate product from said sodium chloride having a residual chloride content of less than about 2 wt. %, and recovering the removed hydrogen chloride in the form of hydrochloric acid having a concentration of at least about 20 wt. % HCl.

2. The process of claim 1 wherein said alkali metal chloride is potassium chloride.

3. The process of claim 2 wherein said molar feed ratio of phosphorus to potassium is about 1.5:1 to about 2:1.

4. The process of claim 2 wherein said molar feed ratio of phosphorus to potassium is substantially 1.5:1.

5. The process of claim 1 wherein said reaction is effected at a temperature of about 150° to about 190° C.

6. The process of claim 1 wherein said reaction is effected at a temperature of about 180° C.

7. The process of claim 2 wherein said potassium phosphate product is a solid product containing less than about 1 wt. % residual chloride.

8. The process of claim 1 wherein said passage of air through the reaction mixture is effected for at least about 90% of the period of reaction of the alkali metal chloride.

9. The process of claim 8 wherein said air stripping is continued during the steam stripping in the second portion of the reaction.

10. The process of claim 2 wherein said potassium chloride is solid particulate fertilizer grade potassium chloride and said phosphoric acid is technical grade phosphoric acid containing about 50 to about 75 wt. % $P_2O_5$, whereby the potassium phosphate product is useful as a low residual chloride fertilizer.

11. The process of claim 10 wherein said potassium phosphate product is recovered as pure potassium dihydrogen phosphate.

12. The process of claim 11 wherein said potassium dihydrogen phosphate is neutralized by caustic potash to produce dipotassium hydrogen phosphate and said dipotassium hydrogen phosphate is calcined to produce tetrapotassium pyrophosphate.

13. The process of claim 10 wherein said potassium phosphate product is neutralized with caustic potash to produce dipotassium hydrogen phosphate and said dipotassium hydrogen phosphate is calcined to produce tetrapotassium pyrophosphate.

14. The process of claim 10 wherein said potassium phosphate product is dissolved in water to provide a liquid fertilizer having a chloride content less than about 1.0 wt. %.

15. The process of claim 10 wherein said potassium phosphate product is ammoniated to form a liquid fertilizer having a near neutral pH of about 6 to about 8 and a chloride content of less than about 1 wt. %.

16. The process of claim 10 wherein said potassium phosphate product is neutralized with caustic potash and then nitrated using ammonia and/or urea to produce a high analysis liquid fertilizer, a suspension fertilizer or a high water-soluble solid fertilizer, each containing less than about 1 wt. % chloride ion.

17. The process of claim 1 carried out as a continuous process.

18. The process of claim 1 carried out as a batch process.

19. The process of claim 1 wherein said alkali metal chloride is sodium chloride or is replaced by sodium carbonate to form sodium phosphate.

20. The process of claim 19 wherein said sodium phosphate is neutralized by caustic soda to form trisodium phosphate.

21. The process of claim 19 wherein said sodium phosphate is recovered in the form of pure monobasic or dibasic sodium orthophosphate.

22. The process of claim 19 wherein a mixture of about one mole of monobasic sodium orthophosphate and about two moles of dibasic sodium orthophosphate is calcined to form sodium tripolyphosphate.

23. A process for the production of potassium pyrophosphate, which comprises:

(a) reacting potassium chloride with phosphoric acid in a molar feed ratio of phosphorus to potassium in the range of at least about 1.3:1 at a temperature of about 130° to about 200° C. to produce potassium phosphate and by-product hydrogen chloride;

(b) recovering acid hydrogen chloride from the reaction medium by passing air through the reaction mixture during a first portion of the period of reaction of the potassium chloride and by steaming through the reaction mixture during the remainder of the period of reaction of potassium chloride to result in a potassium phosphate product having a residual chloride content of less than about 2 wt. %;

(c) recovering the removed hydrogen chloride in the form of hydrochloric acid having a concentration of at least about 20 wt. % HCl;

(d) reacting said potassium phosphate with potassium hydroxide under pH conditions sufficient to neutralize said potassium phosphate and form dipotassium hydrogen phosphate; and (e) calcining said dipotassium hydrogen phosphate at a temperature of about 200° to about 400° C. to form potassium pyrophosphate.

24. The process of claim 23 wherein said neutralization step is effected at a pH of about 8 to about 10.

* * * * *